(12) United States Patent
Hotchkiss et al.

(10) Patent No.: US 11,140,215 B2
(45) Date of Patent: Oct. 5, 2021

(54) CLAIMING NETWORK DEVICES FOR A HOME NETWORK IN A DISTRIBUTED WI-FI NETWORK

(71) Applicant: Plume Design, Inc., Palo Alto, CA (US)

(72) Inventors: Adam Hotchkiss, Burlingame, CA (US); Hong Fan, San Jose, CA (US); Aman Singla, Saratoga, CA (US); Kiran Edara, Cupertino, CA (US); Kaixiang Hu, Fremont, CA (US)

(73) Assignee: Plume Design, Inc., Palo Alto, CA (US)

( * ) Notice: Subject to any disclaimer, the term of this patent is extended or adjusted under 35 U.S.C. 154(b) by 299 days.

(21) Appl. No.: 15/463,763

(22) Filed: Mar. 20, 2017

(65) Prior Publication Data

US 2017/0272507 A1 Sep. 21, 2017

Related U.S. Application Data

(60) Provisional application No. 62/310,598, filed on Mar. 18, 2016.

(51) Int. Cl.
| | |
|---|---|
| *G06F 15/173* | (2006.01) |
| *H04L 29/08* | (2006.01) |
| *H04W 4/80* | (2018.01) |
| *G06F 15/16* | (2006.01) |
| *H04W 84/12* | (2009.01) |
| *H04W 88/08* | (2009.01) |

(52) U.S. Cl.
CPC ............. *H04L 67/10* (2013.01); *H04L 67/12* (2013.01); *H04L 67/16* (2013.01); *H04W 4/80* (2018.02); *H04W 84/12* (2013.01); *H04W 88/08* (2013.01)

(58) Field of Classification Search
CPC ......... H04L 67/10; H04L 67/16; H04L 67/12; H04W 4/80; H04W 84/12; H04W 88/08
USPC ........................................................ 709/224
See application file for complete search history.

(56) References Cited

U.S. PATENT DOCUMENTS

| | | | |
|---|---|---|---|
| 7,315,533 B2 | 1/2008 | Theobold et al. | |
| 7,414,978 B2 | 8/2008 | Lun et al. | |
| 7,953,403 B2 | 5/2011 | Nientiedt | |
| 8,218,502 B1 * | 7/2012 | Liu | H04W 8/26 370/331 |
| 8,340,711 B1 * | 12/2012 | Glass | H04W 4/90 455/552.1 |
| 8,798,021 B2 | 8/2014 | Mangalvedhe et al. | |
| 9,060,279 B2 | 6/2015 | Ganu et al. | |
| 9,066,251 B2 | 6/2015 | Madan et al. | |
| 9,131,391 B2 | 9/2015 | Madan et al. | |

(Continued)

*Primary Examiner* — Karen C Tang
(74) *Attorney, Agent, or Firm* — Clements Bernard Walker; Lawrence A. Baratta, Jr.; Jacob P. Beers

(57) ABSTRACT

Systems and methods implemented through a user device, for claiming network devices for a home network in a distributed Wi-Fi network includes discovering a newly powered on access point; claiming the newly powered on access point for the home network; and relaying the claimed newly powered on access point to a cloud controller via a disjoint network from the home network, wherein the home network is restricted by the cloud controller to only operate with claimed access points. The discovering, the claiming, and the relaying can be performed by a mobile application executed on the user device.

20 Claims, 12 Drawing Sheets

(56) References Cited

U.S. PATENT DOCUMENTS

| | | |
|---|---|---|
| 9,131,392 B2 | 9/2015 | Madan et al. |
| 9,420,528 B2 | 8/2016 | Madan et al. |
| 9,497,700 B2 | 11/2016 | Madan et al. |
| 9,510,214 B1 | 11/2016 | Balasubramaniam et al. |
| 9,516,579 B1 | 12/2016 | Diner et al. |
| 2004/0068668 A1* | 4/2004 | Lor .................. H04W 12/1202 726/15 |
| 2006/0258395 A1* | 11/2006 | Cave .................... H04W 72/02 455/552.1 |
| 2007/0149172 A1 | 6/2007 | Dickinson |
| 2007/0242621 A1 | 10/2007 | Nandagopalan et al. |
| 2008/0175386 A1* | 7/2008 | Bestermann ......... H04L 63/062 380/270 |
| 2009/0190522 A1* | 7/2009 | Horn .................. H04W 40/248 370/315 |
| 2009/0257380 A1 | 10/2009 | Meier |
| 2009/0279427 A1 | 11/2009 | Ji et al. |
| 2009/0316585 A1 | 12/2009 | Srinivasan |
| 2009/0323632 A1 | 12/2009 | Nix |
| 2011/0039554 A1 | 2/2011 | Bims |
| 2011/0151886 A1 | 6/2011 | Grayson et al. |
| 2012/0002567 A1* | 1/2012 | Sun ....................... H04W 28/16 370/252 |
| 2012/0087268 A1 | 4/2012 | Savoor et al. |
| 2012/0122503 A1 | 5/2012 | Ma et al. |
| 2012/0257585 A1 | 10/2012 | Sydor et al. |
| 2013/0083689 A1* | 4/2013 | Mercier ................ H04W 8/005 370/254 |
| 2013/0201857 A1 | 8/2013 | Bhargava et al. |
| 2013/0272285 A1 | 10/2013 | Goldsmith et al. |
| 2014/0073289 A1* | 3/2014 | Velasco ........... H04W 12/04031 455/411 |
| 2014/0092765 A1 | 4/2014 | Agarwal et al. |
| 2014/0126410 A1* | 5/2014 | Agarwal ................ H04W 36/32 370/252 |
| 2014/0328190 A1* | 11/2014 | Lord ..................... H04W 24/08 370/252 |
| 2014/0349694 A1* | 11/2014 | Raghothaman ....... H04W 72/04 455/509 |
| 2015/0023245 A1* | 1/2015 | Du ........................ H04L 45/304 370/315 |
| 2015/0237540 A1* | 8/2015 | Van Lieshout ....... H04W 36/08 455/436 |
| 2015/0304983 A1* | 10/2015 | Krening ............... H04B 17/318 370/254 |
| 2015/0365881 A1* | 12/2015 | Scherzer ............... H04W 28/08 455/414.1 |
| 2016/0007255 A1* | 1/2016 | Sharma ................. H04W 36/08 370/331 |
| 2016/0044719 A1* | 2/2016 | Sidhu ..................... H04W 4/00 370/329 |
| 2016/0080949 A1 | 3/2016 | Chandrasekhar et al. |
| 2016/0212695 A1* | 7/2016 | Lynch ................... H04W 48/18 |
| 2016/0219475 A1* | 7/2016 | Kim ...................... H04W 76/27 |
| 2017/0026382 A1* | 1/2017 | Trigger ................. H04L 63/102 |
| 2017/0318614 A1* | 11/2017 | Wang ...................... H04L 12/06 |
| 2018/0063714 A1* | 3/2018 | Stephenson ........... H04W 12/06 |
| 2019/0045583 A1* | 2/2019 | Van Phan ............. H04W 76/15 |
| 2019/0342928 A1* | 11/2019 | Kawaguchi ........... H04W 24/02 |

* cited by examiner

Adding New Pods

Continue plugging in all Pods you want to add.

Looking for Pods...

CLAIMING NETWORK DEVICES FOR A HOME NETWORK IN A DISTRIBUTED WI-FI NETWORK

CROSS-REFERENCE TO RELATED APPLICATION(S)

The present patent/application claims priority to U.S. Provisional Patent Application No. 62/310,598, filed Mar. 18, 2016, and entitled "CLAIMING NETWORKING DEVICES FOR A HOME NETWORK," the contents of which are incorporated by reference.

FIELD OF THE DISCLOSURE

The present disclosure generally relates to wireless networking systems and methods. More particularly, the present disclosure relates to claiming network devices for a home network in a distributed Wi-Fi system.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

Installation and management of Wi-Fi client devices can be difficult because of variations in the environments and varying levels of knowledge of installers of the Wi-Fi client devices. Also, segmentation of the Wi-Fi client devices and access point may be necessary for security and ownership; however, Wi-Fi radios are capable of sending signals between homes, apartments, etc. and thus have the capability of reaching many unwanted devices outside of the desired segmented network.

BRIEF SUMMARY OF THE DISCLOSURE

In an exemplary embodiment, a method, implemented by a user device, for claiming network devices for a home network in a distributed Wi-Fi network includes discovering a newly powered on access point; claiming the newly powered on access point for the home network; and relaying the claimed newly powered on access point to a cloud controller via a disjoint network from the home network, wherein the home network is restricted by the cloud controller to only operate with claimed access points. The discovering can be via a first networking protocol and the relaying can be via a second networking protocol different from the first networking protocol. The first networking protocol can include a wireless Personal Area Networking (PAN) protocol and the second networking protocol can include one of a Wireless Local Area Networking (WLAN) protocol and a wireless cellular protocol. The first networking protocol can include Bluetooth and the second networking protocol can include Long Term Evolution (LTE), each supported by the user device and an associated mobile application for performing the method. The discovering can include receiving one-way information identifying the access point, the claiming can include the access point based on the one-way information to the home network, and the relaying can include transmitting identification of the access point and the associating with the home network.

The method can further include uniquely identifying a location or name of the access point through the user device via a mobile application and a short range beacon. The method can further include uniquely identifying a location or name of the access point and/or performing the claiming through the user device via a camera monitoring an optical output on the access point for information. The claimed newly powered on access point can be configured to only connect to the home network. The access point can be in a preconfigured pack of a plurality of access points that are one or more of configured to connect to one another and associated to the home network based on a user/owner/administrator. The method can further include adding an additional access point in the home network, wherein the additional access point is pre-configured and the adding is performed without user intervention. The access point can be in a preconfigured pack of a plurality of access points with a specified number, and the method can further include indicating the specified number to a user of the home network to indicate how many of the plurality of access points need to be plugged in and how many have been found/not found in the home network.

In another exemplary embodiment, a user device configured to claim network devices for a home network in a distributed Wi-Fi network includes a plurality of network interfaces; one or more processors communicatively coupled to the plurality of network interfaces; and memory storing instructions that, when executed, cause the one or more processors to: discover a newly powered on access point; claim the newly powered on access point for the home network; and relay the claimed newly powered on access point to a cloud controller via a disjoint network from the home network, wherein the home network is restricted by the cloud controller to only operated with claimed access points. The memory storing instructions that, when executed, further cause the one or more processors to: execute a mobile application to discover the newly powered on access point, to claim the newly powered on access point, and to relay the claimed newly powered on access point to the cloud controller. The newly powered on access point can be discovered via a first networking protocol associated with a first network interface and the claimed newly powered on access point can be relayed via a second networking protocol with a second network interface, and where the second networking protocol is different from the first networking protocol. The newly powered on access point can be discovered by receiving one-way information identifying the access point, the newly powered on access point is claimed by associating the access point based on the one-way information to the home network, and the identification of the access point and its associating with the hone network is relayed to the cloud controller. The memory storing instructions that, when executed, can further cause the one or more processors to: uniquely identify a location or name of the access point through the user device. The claimed newly powered on access point can be configured to only connect to the home network. The access point can be in a preconfigured pack of a plurality of access points that are one or more of configured to connect to one another and associated to the home network based on a user/owner/administrator.

In a further exemplary embodiment, a cloud controller configured to provision claimed network devices in a home network in a distributed Wi-Fi network includes a network interface; one or more processors communicatively coupled to the network interface; and memory storing instructions that, when executed, cause the one or more processors to: responsive to a user device discovering and claiming a newly powered on access point for the home network, receive the claimed newly powered on access point from the user device via a disjoint network from the home network; and provision the claimed newly powered on access point for the home network, wherein the home network is restricted by the cloud controller to only operated with claimed access points. The newly powered on access point can be discovered via a first networking protocol associated with a first network interface on a user device and the claimed newly powered on access point can be relayed via a second networking protocol with a second network interface user device, and where the second networking protocol is different from the first networking protocol.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

The distributed Wi-Fi setup systems and methods describe various approaches for how access points, i.e., nodes in the distributed Wi-Fi system, are discovered, claimed, and segmented in the distributed Wi-Fi system. Specifically, the systems and methods utilize a mobile device, user device, Wi-Fi client device, etc. (collectively referred to as a mobile device) to discover and claim each node (access point) in the distributed Wi-Fi system and to communicate to a cloud service which acts as a cloud controller for the distributed Wi-Fi system. The mobile device can communicate to the node using local or personal wireless area networks, such as Bluetooth and to the cloud controller using a separate network such as Long Term Evolution (LTE).

Distributed Wi-Fi system

Figure 1:
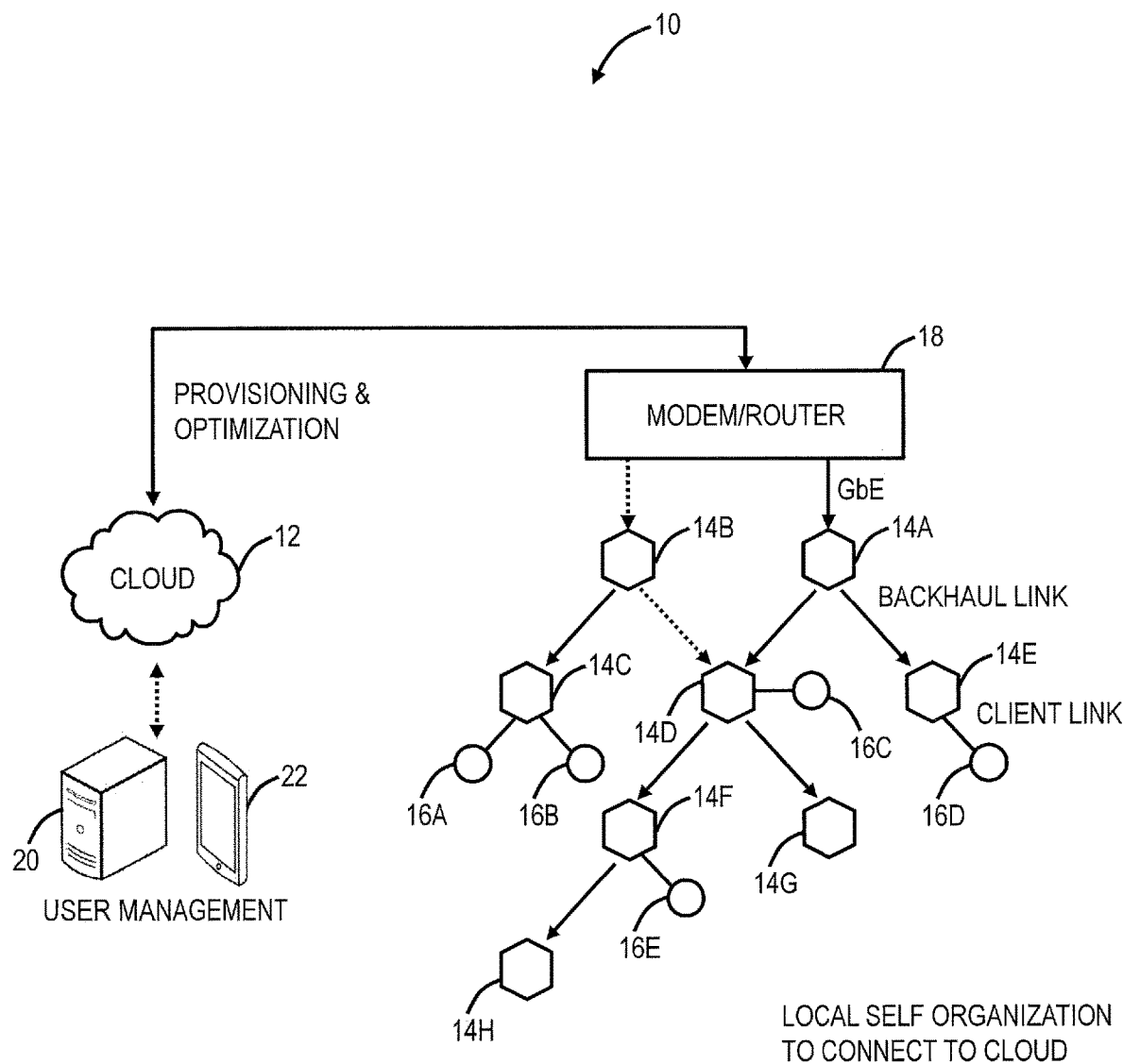
FIG. 1 is a network diagram of a distributed Wi-Fi system with cloud-based control.

Referring to FIG. 1, in an exemplary embodiment, a network diagram illustrates a Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
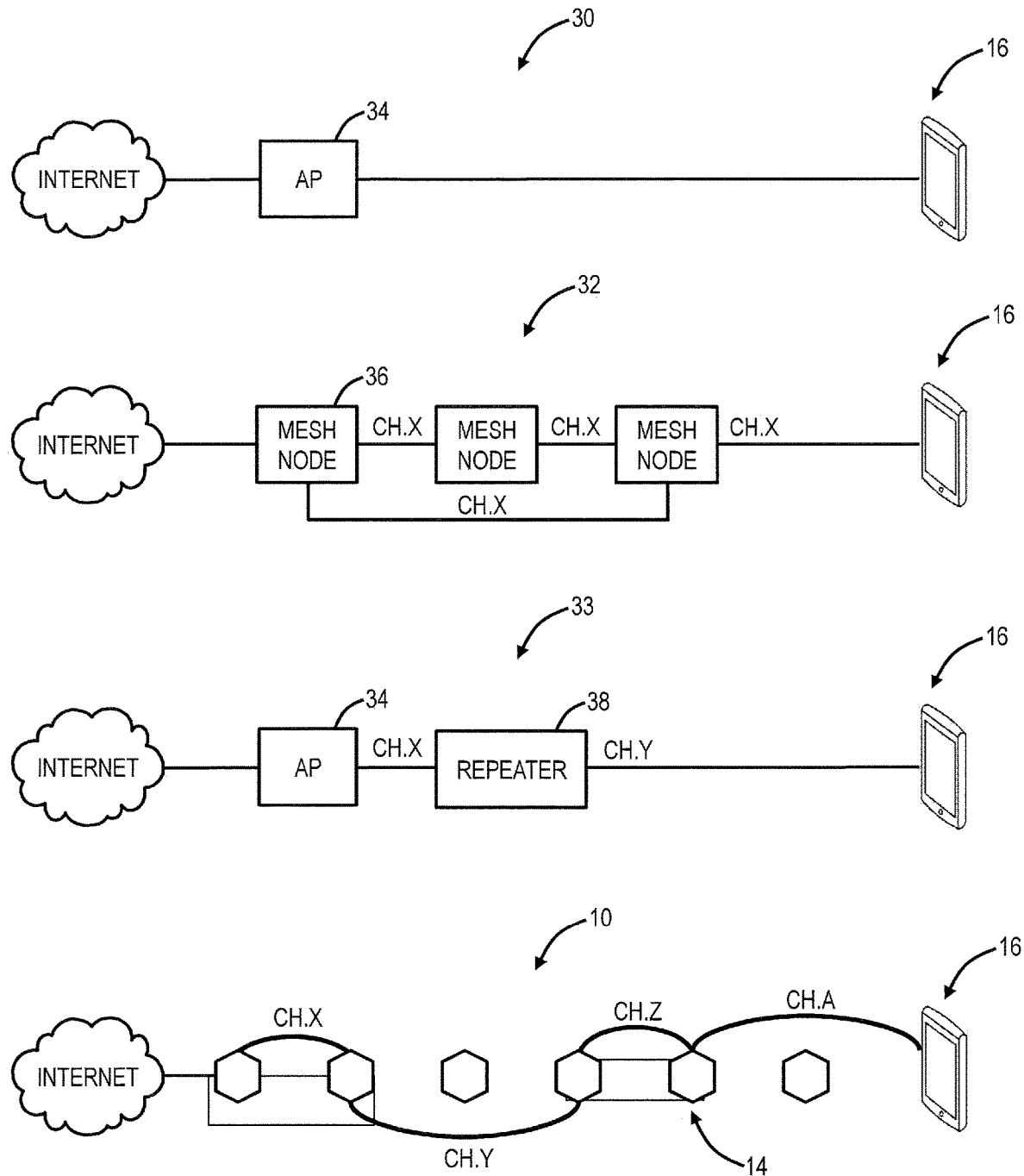
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only 1⁄3 the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channelsbands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
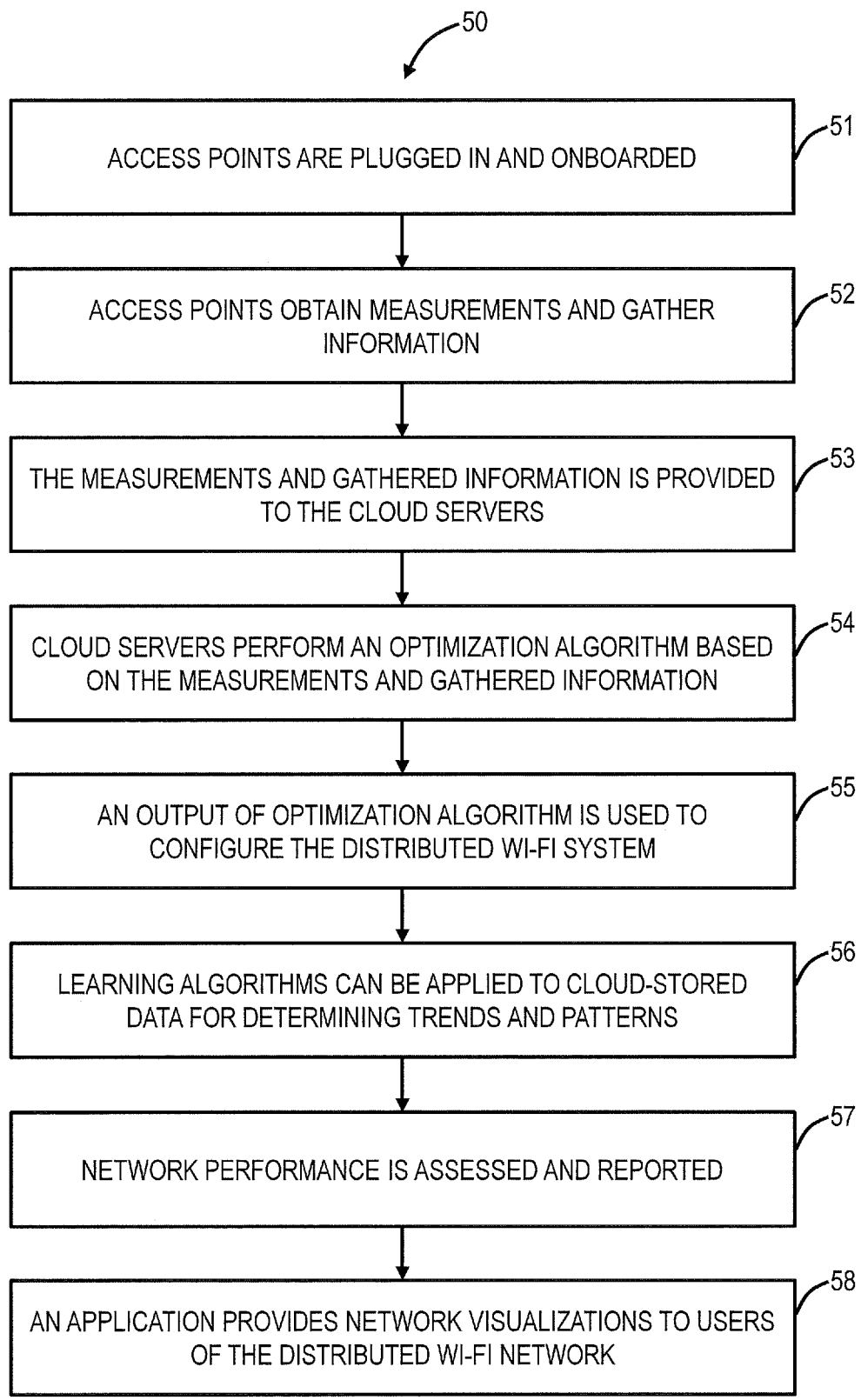
FIG. 3 is a flowchart of a configuration and optimization process for the distributed Wi-Fi system of FIG. 1.
Figure 4:
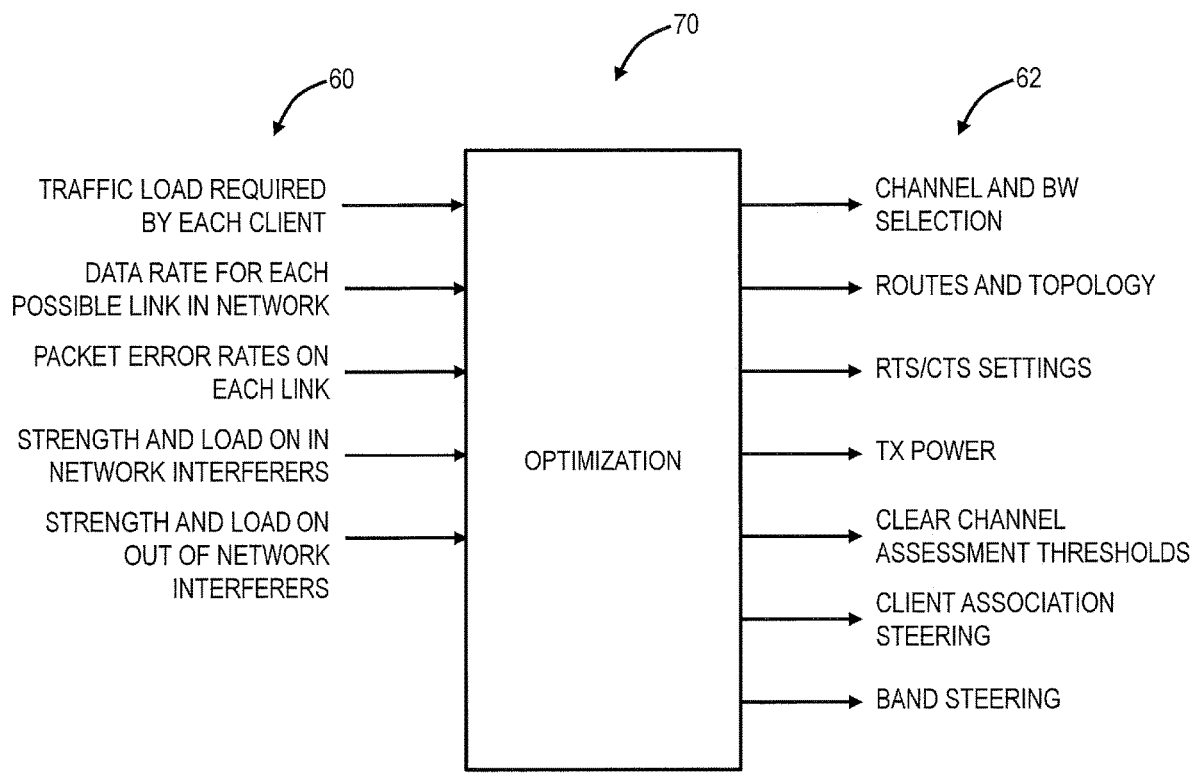
FIG. 4 is a block diagram of inputs and outputs to an optimization as part of the configuration and optimization process of FIG. 3.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication with the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers"). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Referring to FIG. 3, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
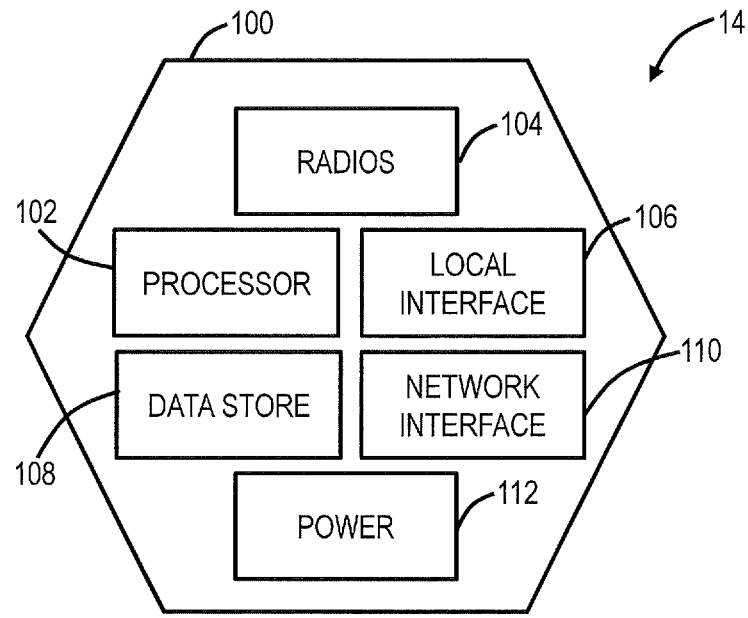
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10 BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
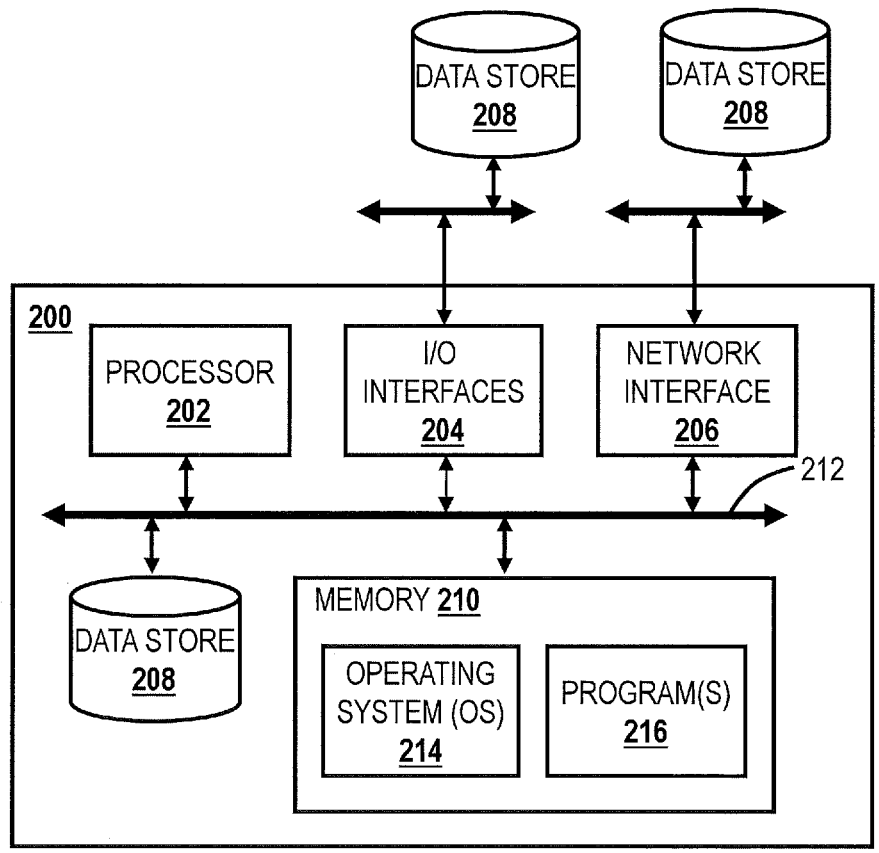
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11 a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70, claiming Wi-Fi client devices 16, etc.

Claiming Radios

Again, the distributed Wi-Fi system 10 includes multiple access points 14 capable of operating in either a gateway or bridge mode of operation. The gateway node includes the access point 14 connected to the modem/router 18 whereas the remaining access points 14 in the distributed Wi-Fi system 10 are bridge nodes. Collectively, the access points 14 and associated Wi-Fi client devices 16 in the distributed Wi-Fi system 10 make up a "home network." That is, the access points 14 and associated Wi-Fi client devices 16 typically belong to a single home or apartment, in which each access point 14 is able to communicate in the data and management plane with each other or Wi-Fi client devices 16 belonging to the home network. Communications between the access points 14 or Wi-Fi client devices 16 can be through either wireless or wired technologies. Wired technologies are typically contained within the home network due to their physical nature; however, wireless communications are capable of transmitting between the home network and other networks/locations by way of the ability of wireless communication propagation through walls, floors, roofs, etc. to other neighbors. Therefore, a mechanism to define the boundary of the home network and the access points 14 or Wi-Fi client devices 16 belonging to that home network is required.

Bluetooth Beacon

Bluetooth Low Energy is a wireless personal area networking protocol which can send out a one-way beacon containing specific information about the sending device to inform the receiving device of information such as a status, identification, etc. of the sending device. The Bluetooth beacon is a data packet or series of data packets sent from a device containing a Unique Identification (UUID) marker (e.g., serial number) and product classification of the sending device (e.g., UUID) along with a status indication. The status indication may provide information about the operational state of the sending device, the performance and status of communication ports, and troubleshooting or failure states. Standards such as iBeacon (from Apple) and Eddystone (from Google) are standardized frame formats to send such beacons; however, proprietary approaches may also be used with equivalent functionality.

The access point 14, or another such networking device, may send out Bluetooth beacons with varying power levels to inform a listening device of the identification and status of the sending device. The power level of the wireless beacon may be set to such a power to avoid the transmission through walls or outside of the immediate room, thus limiting the chance of a device in a neighboring home or apartment from receiving the beacon information. This limitation of distance propagation helps isolate the home network discovery range to a confined space, such as a home or apartment. The Bluetooth beacon typically contains a unique identifier to notify a listening device of the identification of the sending device. Additionally, the same or subsequent beacon may contain status information related to the operation or state of the sending device. A listening device, such as a phone or computer, can process the beacon to assist in the provisioning and monitoring of the sending device.

Claiming Devices in a Distributed Wi-Fi Network

Figure 7:
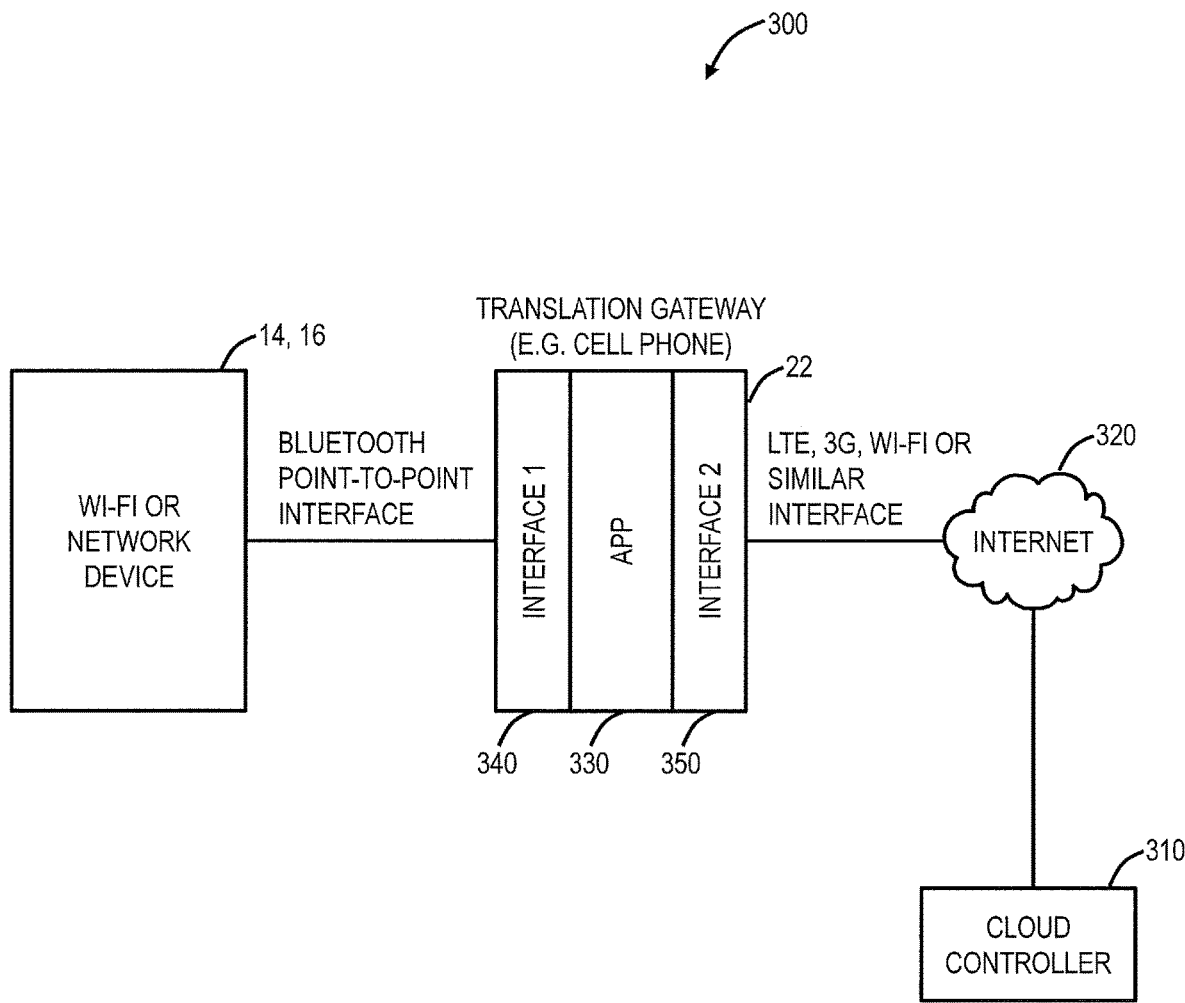
FIG. 7 is a network diagram of a setup for claiming a wireless device for the distributed Wi-Fi system.

Referring to FIG. 7, in an exemplary embodiment, a network diagram illustrates a setup 300 for claiming a wireless device 14, 16 for the distributed Wi-Fi system 10 or other distributed Wi-Fi networks. The setup 300 includes a user device 22 (also this could be one of the Wi-Fi client devices 16) which communicates with both the access point 14 or the Wi-Fi client device 16 and to a cloud controller 310 over the Internet 320. The cloud controller 310 can be the cloud 12 and the servers 20 in the distributed Wi-Fi system 10. The user device 22 includes a similar architecture as shown in FIG. 6. The user device 22 includes a mobile application ("app") 330, a first interface 340, and a second interface 350. In FIG. 6, the app 330 can be one of the programs 216 and the interfaces 340, 350 can be part of the network interfaces 206. The first interface 340 can be a wireless Personal Area Network (PAN) interface, such as Bluetooth. The second interface 350 can be a Wide Area Network (WAN) or Local Area Network (LAN) interface, such as LTE, 3G, Wi-Fi, etc. When the second interface 350 is Wi-Fi, it can operate on a different Wi-Fi network besides the distributed Wi-Fi system 10 as the user device 22 here is used to claim nodes for setting up the distributed Wi-Fi system 10. The app 330 is configured to perform various functions described herein for discovering, claiming, and segmenting (with the cloud controller 310) devices in the distributed Wi-Fi system 10.

Figure 8:
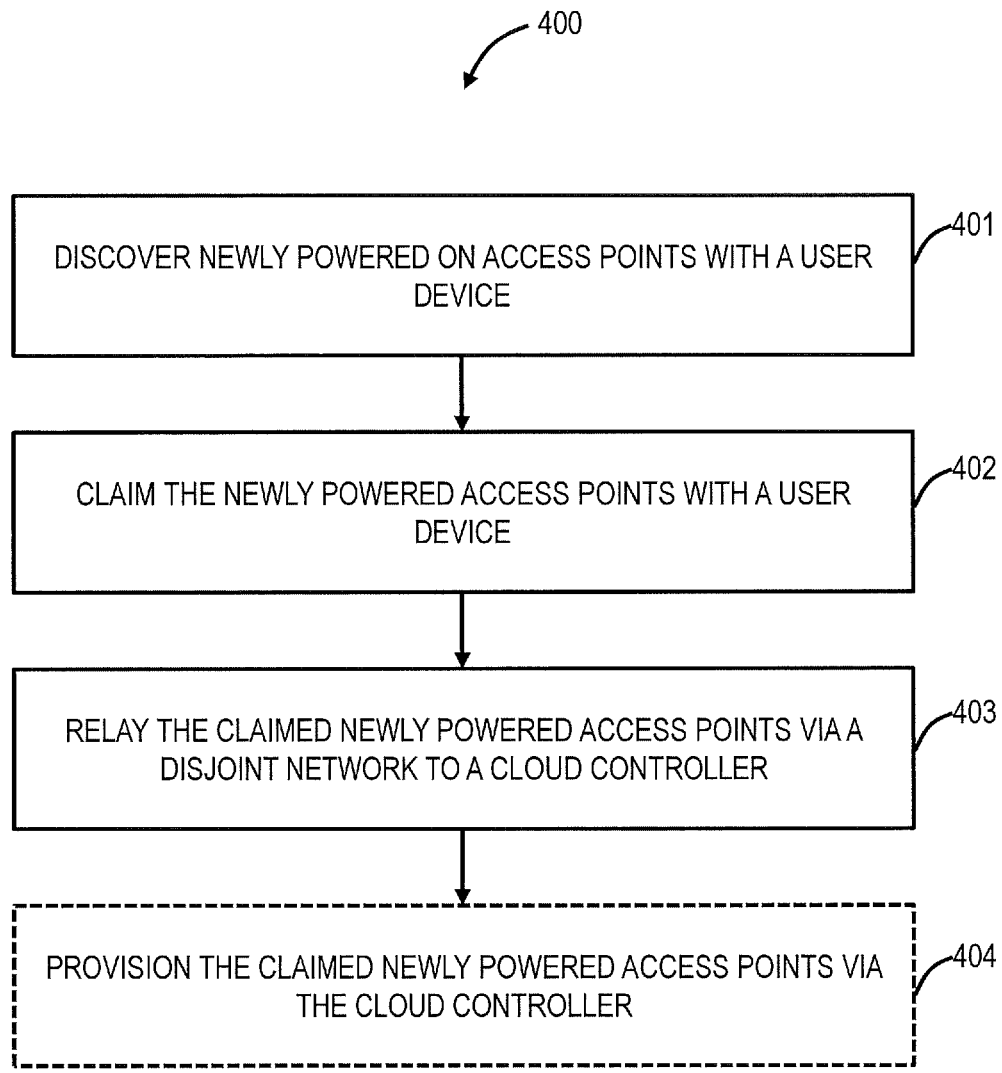
FIG. 8 is a flowchart of a claiming method using the user device to claim access points in the distributed Wi-Fi system.
Figure 9:
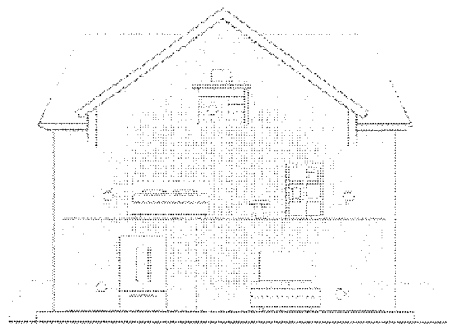
FIG. 9 is a screenshot of the mobile app looking for access points ("pods")
Figure 10:
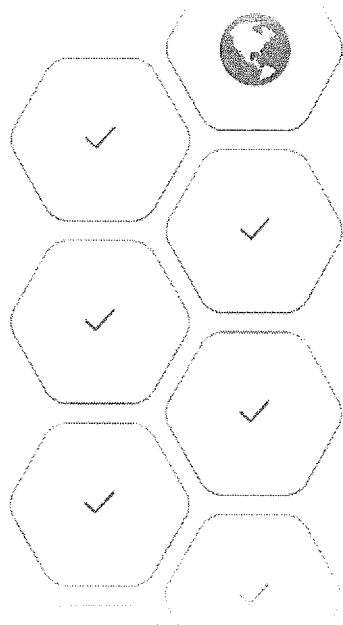
FIG. 10 is a screenshot of the mobile app having found access points.
Figure 10:
Figure 11:
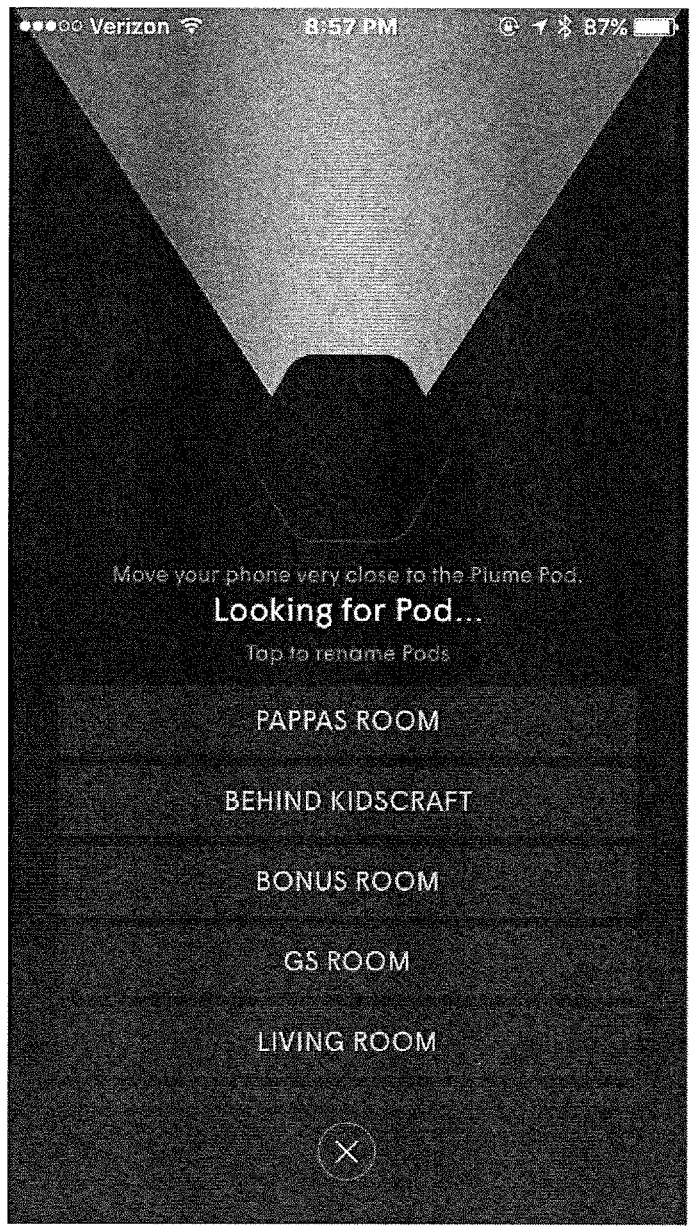
FIG. 11 is a screenshot of the mobile app looking for an access point for purposes of uniquely identifying the access point.
Figure 12:
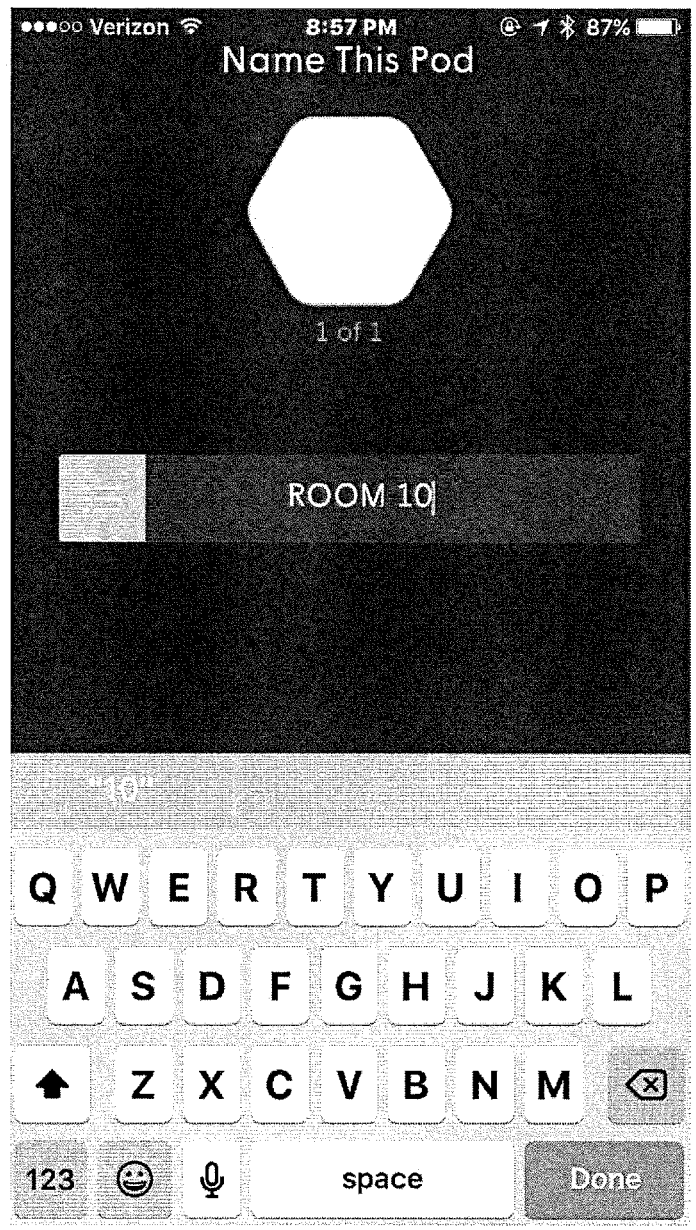
FIG. 12 is a screenshot of the mobile app uniquely naming the access point.
Figure 13:
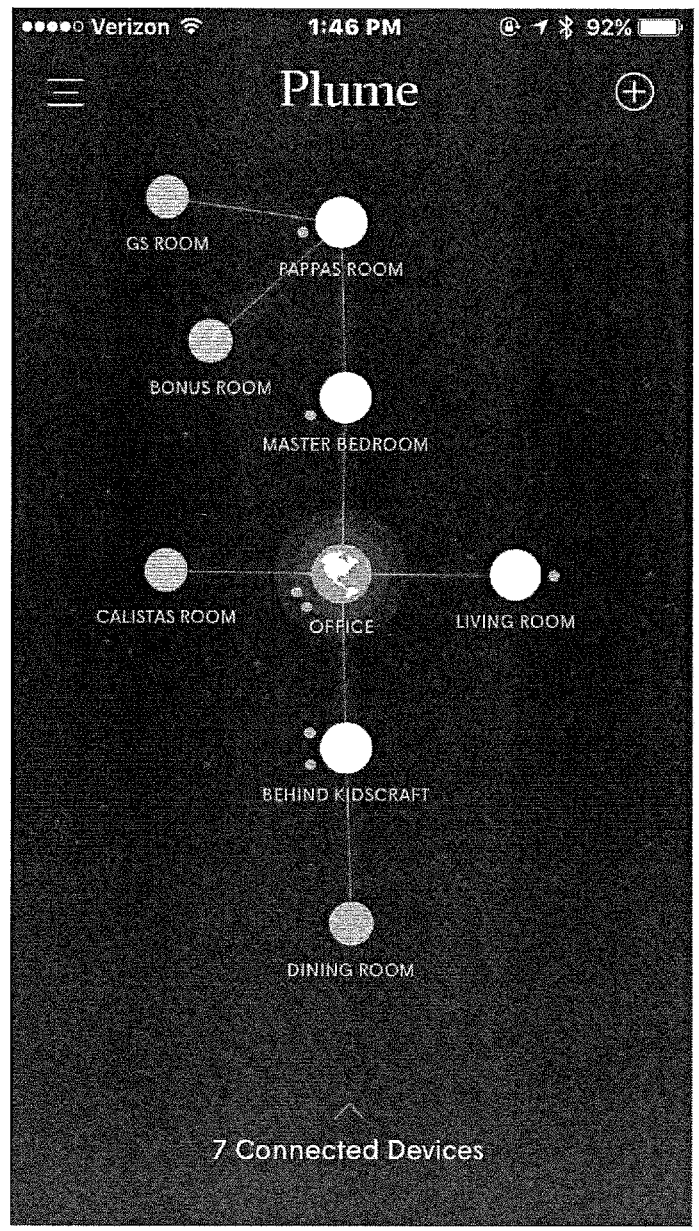
FIG. 13 is a screenshot of the mobile app showing a current configuration of the distributed Wi-Fi system with each access point uniquely claimed and named.

Referring to FIG. 8, in an exemplary embodiment, a flowchart illustrates a claiming method 400 using the user device 22 to claim access points 14 in the distributed Wi-Fi system 10. Referring to FIGS. 9-13, in exemplary embodiments, screen shots illustrate operations in the mobile app 330. FIG. 9 is a screenshot of the mobile app 330 looking for access points 14 ("pods"), FIG. 10 is a screenshot of the mobile app 330 having found access points 14, FIG. 11 is a screenshot of the mobile app 330 looking for an access point 14 for purposes of uniquely identifying the access point 14, FIG. 12 is a screenshot of the mobile app 330 uniquely naming the access point 14, and FIG. 13 is a screenshot of the mobile app 330 showing a current configuration of the distributed Wi-Fi system 10 with each access point 14 uniquely claimed and named.

In FIG. 8, first, the user device 22 can discover newly powered on access points 14 (step 401). The discovery of newly powered on access points 14 can be using Bluetooth or some other wireless PAN connection as described herein. In an exemplary embodiment, the access points 14 are configured with a Bluetooth, Bluetooth Low Energy, or some other wireless PAN interface to broadcast one-way information to the user device 22. Again, the one-way information can include status, identification, etc. of the access point 14. In another exemplary embodiment, the discovery of newly powered on access points 14 can be via a predefined SSID where the newly powered on access points 14 simply communicate the one-way information. For example, the mobile app 330 can be configured to cause the user device 22 to monitor the predefined SSID for the one-way information. Also, the mobile app 330 can communicate back to the newly powered on access points 14 to provide an acknowledgment that the one-way information was received, and, optionally, the newly powered on access points 14 can discontinue transmitting on the predefined SSID. In a further exemplary embodiment, the newly powered on access points 14 can be discovered by the mobile app 330 using a camera associated with the user device 22. For example, the user can point the camera at the newly powered on access points 14, and they can provide the one-way information through unique modulation of a status indicator such as a Light Emitting Diode (LED) on the access points 14. Other techniques are also contemplated for discovering the newly powered on access points 14.

The claiming method 400 is performed by the user device 22 operating the mobile app 330. The discovery of the newly powered on access points 14 in step 401 is performed through the mobile app 330. The discovery of the newly powered on access points 14 is performed locally at a residence, home, location, etc. of the distributed Wi-Fi system 10. In FIG. 9, the user is instructed to "spread remaining pods" which are the access points 14, and the mobile app 330 is configured to look for, i.e., discover the newly powered on access points 14. In FIG. 10, the mobile app 330 has discovered seven access points 14 providing visual indication. Note, the top right access point 14 includes a globe icon indicating this is the gateway node which connects to the modem/router 18 and the remaining access points 14 have a check icon indicating these are Wi-Fi nodes which do not connect to the modem/router 18.

After the newly powered on access points 14 are discovered (step 401), the newly powered on access points 14 are claimed with the user device 22 (step 402). The process of claiming the access points 14 assigns the ownership of the access points 14 to the distributed Wi-Fi system 10. Specifically, only claimed access points 14 are allowed to communicate and operate in the distributed Wi-Fi system 10. In an exemplary embodiment, the access points 14 are automatically claimed based on the discovery and the associated one-way information. Here, the mobile app 330 can automatically claim the access point 14 based on receipt of the one-way information. Optionally, the user can be given a choice to accept the claimed access point 14, via the mobile app 330. Note, the discovery and the automatic claiming based thereon can assign the access points 14 membership in the distributed Wi-Fi system 10, but these approaches do not necessarily provide an exact physical location of each access point 14.

The claiming method 400 can optionally include a location determination of each newly discovered access point 14. In an exemplary embodiment, the location determination is performed subsequent to the claiming step 402. In another exemplary embodiment, the access points 14 are claimed through the location determination. In either approach, the location determination is a process with the mobile app 330 where each access point 14 is uniquely identified based on its location. The location determination process can include the mobile app 330 being in proximity to an access point 14 and the user entering location specific information about the proximate access point 14. For example, the mobile app 330 can use the camera associated with the user device 22 to identify the proximate access point 14. For example, the proximate access point 14 can be identified by the camera based on modulation of some unique information on the status indicator (LED) on the access point 14.

FIG. 11 illustrates the mobile app 330 using the camera on the user device 22 for a unique determination. For example, the user is directed by the mobile app 330 to bring a newly powered on or discovered access point 14 into the view of the hexagon icon on the mobile app 330 by physically moving the user device 22 such that the camera is in view of the newly powered on or discovered access point 14. Once in view, the access point 14 can uniquely identify itself, such as through a Bluetooth communication, a wireless PAN communication, change in the status indicator, etc. For the Bluetooth communication or the wireless PAN communication, the communication can be low power and directed outward from the access point 14 so that the user device 22 can only recognize the access point 14 when it is in close proximity. Being in close proximity would be indicated to the user by showing the access point within the hexagon icon in the mobile app.

Once the access point 14 has its location uniquely determined, the mobile app 330 can allow the user to enter a unique name, such as a room name, location, or any other unique identification information for the user. FIG. 12 is the mobile app 330 with a screen shot for naming the access point 14. Here, the user can use the mobile app 330 to provide a unique name, e.g., Room 10.

Back in FIG. 8, after the claiming step 402, the mobile app 330 is configured to relay the claimed newly powered access points 14 via a disjoint network to the cloud controller 310, cloud service, the servers 20, etc. (step 403). As described herein, the disjoint network is any network besides the distributed Wi-Fi system 10 or the distributed Wi-Fi network associated with the claimed newly powered access points 14. Provisioning of Wi-Fi access points or networking devices from a centralized cloud-based or local management system may require a connection between two disjoint communication networks to pass vital configuration information for the new device to associate securely with the cloud controller 310. For example, the two disjoint communication networks can include a first network (e.g., PAN, Bluetooth, etc.) for the user device 22 to communicate, discover, and claim the access points 14 and a second network (e.g., LTE, 3G, Wi-Fi, etc.) to communicate the claimed access points 14 to the cloud controller 310. An example of disjoint communication networks is a Bluetooth wireless connection and an LTE cellular connection with an Internet gateway. The Bluetooth wireless connection is a point-to-point communication protocol connecting the Wi-Fi access point or networking device with an LTE cellular or Wi-Fi enabled device, such as the user device 22. The user device 22 has interfaces for both disjoint networks and software capable of joining the networks together to pass messages between the two disjoint networks. i.e., the mobile app 330. Protocols and message formats between the disjoint networks may be different, in which case a software or hardware based translator is required to convert the message and protocol formats to match the disjoint network requirements. This can be implemented via the mobile app 330.

Finally, the cloud controller 310 can be configured to provision the claimed newly powered access points 14 (step 404). The configuration can include operational parameters for proper operation in the distributed Wi-Fi system 10 or the distributed Wi-Fi network. Additionally, the configuration includes ensuring the claimed newly powered access points 14 only support communication in the proper Wi-Fi network.

Configured "Packs"

Wi-Fi access points, or other networking devices in the home network, may be configured in "packs" of devices to form a group belonging to the home network. This group can include two or more devices, tied together by a unique identifier. The devices of this pack can be constrained to talking only with other devices of the same pre-configured pack, which can serve among two main functions—limit communications and enable communication to the cloud controller 310. For example, the configured packs can limit communications of the home network to only devices in the pack, thus preventing other devices outside of the home network to join. This provides a level of security to prevent the intentional or accidental joining of unwanted devices into the home network. The configured packs also allow cloud based or a local based provisioning and monitoring by the cloud controller 310 to apply or read parameters and statistics only pertaining to devices belonging to the pack of the home network.

One or more devices may be added to the "pack" making up the home network at any time by adding the new device(s)' unique identifier to the pack definition, such as via the mobile app 330, a web portal, etc. The pack definition of unique identifiers belonging to the home network may reside in the cloud controller 310 or a local management system. A new Wi-Fi or other networking device ordered by the administrator/owner of the home network, and known to be destined to be added to the home network, may be pre-configured in the factory, distribution or retail supply chain to belong to a new or existing home network. The pre-configured device can then automatically associate and authenticate with the destined home network and be automatically added, provisioned and monitored without input from the administrator/owner. The pre-configured provisioning information may also be supplied directly to the cloud controller 310 or local management system instead of the Wi-Fi access point 14 or networking device. When the associated Wi-Fi access point 14 or networking device is discovered by the home network management plane, the unique identifier is matched to the provisioning profile of the pre-configured settings saved on the cloud controller 310 or local management system, therefore allowing the correct provisioning and monitoring of the device in the home network. This zero-touch onboarding allows for significant ease of operation. For example, the newly ordered access points 14 can be uniquely tagged to the user who ordered them, such as through an account on the cloud controller 310.

Pre-Configuration

The pre-configuration of the new device may be determined at the time an order is placed by an end administrator/owner, or at any time in the e-commerce, commerce or logistics process in which the end home network is known. Again, this can be tied to the administrator/owner such as via an account on the cloud controller 310. The moments in which the pre-configuration may occur include the following: manufacturing of the device, packing of the device when being prepared to be shipped to a pack-out facility, at the pack-out facility before being placed in the final customer packaging, etc. The pre-configuration can further occur before shipment to the distributor or retail partner but after it is packed in the final customer packaging. This can be achieved by knowing the unique identifier of the package contents and pre-configuring the device in the cloud controller 310 or a local based management server of the home network. The pre-configuration can further occur during the checkout process at a retail store, in which the unique identifier of the package contents can be bound to pre-configuring the device in the cloud controller 310 or a local based management server of the home network.

The pre-configuring can be in two related scenarios. First, a pack of access points 14 can be configured such that all access points 14 in the pack are pre-configured to connect with one another, but not pre-configured to a particular user or network. Here, only one access point 14 needs to be claimed in order to associate with a particular user or network. The remaining access points 14 can be automatically claimed to the particular user or network based on the pre-configuration with the claimed access point 14 in the pack. Second, the pack could be pre-configured not only to connect with each other, but pre-associated to the particular user or network, in which case no user intervention is required to claim the access points. The first scenario works when the pack is bought at retail and the second scenario works when the pack is ordered with an association to a particular account.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for claiming network devices for a home network in a distributed Wi-Fi network, the method comprising:
discovering, by a user device, a newly powered on access point unassigned to the home network and restricted from communicating with the home network including access points of the home network, wherein the user device is one of (1) unconnected to the home network and (2) a client of the home network connected to one of the access points of the home network;
claiming, by the user device, the newly powered on access point for assignment to the home network; and
relaying configuration information for the claimed newly powered on access point from the user device to a cloud controller, for assigning the claimed newly powered on access point to the home network, via a disjoint network between the cloud controller and the user device that is separate from and does not include the home network and the access points thereof, wherein the access points of the home network are restricted by the cloud controller to only communicate and operate with the access points assigned to the home network.

2. The method of claim 1, wherein the discovering is via a first networking protocol and the relaying is via a second networking protocol different from the first networking protocol.

3. The method of claim 2, wherein the first networking protocol comprises a wireless Personal Area Networking (PAN) protocol and the second networking protocol comprises one of a Wireless Local Area Networking (WLAN) protocol and a wireless cellular protocol.

4. The method of claim 2, wherein the first networking protocol comprises Bluetooth and the second networking protocol comprises Long Term Evolution (LTE), each supported by the user device and an associated mobile application for performing the method.

5. The method of claim 1, wherein the discovering comprises receiving one-way information identifying the access point, the claiming comprises associating the access point based on the one-way information to the home network, and the relaying comprising transmitting identification of the access point and the associating with the home network to the cloud controller for the cloud controller to assign the claimed newly powered on access point to the home network.

6. The method of claim 1, further comprising:
uniquely identifying a location or name of the access point through the user device via a mobile application and a short range beacon.

7. The method of claim 1, further comprising:
uniquely identifying a location or name of the access point and/or performing the claiming through the user device via a camera monitoring an optical output on the access point for information.

8. The method of claim 1, wherein the claimed newly powered on access point is configured to only connect to the home network.

9. The method of claim 1, wherein the access point is in a preconfigured pack of a plurality of access points that are one or more of configured to connect to one another and associated to the home network based on a user/owner/administrator.

10. The method of claim 1, further comprising:
adding an additional access point in the home network, wherein the additional access point is pre-configured and the adding is performed without user intervention.

11. The method of claim 1, wherein the access point is in a preconfigured pack of a plurality of access points with a specified number, and the method further comprising:
indicating the specified number to a user of the home network to indicate how many of the plurality of access points need to be plugged in and how many have been found/not found in the home network.

12. A user device configured to claim network devices for a home network in a distributed Wi-Fi network, the user device comprising:
a plurality of network interfaces;
one or more processors communicatively coupled to the plurality of network interfaces; and
memory storing instructions that, when executed, cause the one or more processors to:
discover a newly powered on access point unassigned to the home network and restricted from communicating with the home network including access points of the home network;
claim the newly powered on access point for assignment to the home network; and
relay configuration information for the claimed newly powered on access point from the user device to a cloud controller, for assigning the claimed newly powered on access point to the home network, via a disjoint network between the cloud controller and the user device separate from and does not include the home network and access points thereof, wherein the access points of the home network are restricted by the cloud controller to only communicate and operate with the access points assigned to the home network,
wherein the user device is one of (1) unconnected to the home network and (2) a client of the home network connected to one of the access points of the home network.

13. The user device of claim 12, wherein the memory storing instructions that, when executed, cause the one or more processors to:
execute a mobile application to discover the newly powered on access point, to claim the newly powered on access point, and to relay the claimed newly powered on access point to the cloud controller.

14. The user device of claim 12, wherein the newly powered on access point is discovered via a first networking protocol associated with a first network interface and the claimed newly powered on access point is relayed via a second networking protocol with a second network interface, and where the second networking protocol is different from the first networking protocol.

15. The user device of claim 12, wherein the newly powered on access point is discovered by receiving one-way information identifying the access point, the newly powered on access point is claimed by associating the access point based on the one-way information to the home network, and the identification of the access point and its associating with the home network is relayed to the cloud controller for the cloud controller to assign the claimed newly powered on access point to the home network.

16. The user device of claim 12, wherein the memory storing instructions that, when executed, cause the one or more processors to:
uniquely identify a location or name of the access point through the user device via a mobile application and a short range beacon.

17. The user device of claim 12, wherein the claimed newly powered on access point is configured to only connect to the home network.

18. The user device of claim 12, wherein the access point is in a preconfigured pack of a plurality of access points that are one or more of configured to connect to one another and associated to the home network based on a user/owner/administrator.

19. A cloud controller configured to provision claimed network devices in a home network in a distributed Wi-Fi network, the cloud controller comprising:
a network interface;
one or more processors communicatively coupled to the network interface; and
memory storing instructions that, when executed, cause the one or more processors to:
responsive to a user device discovering a newly powered on access point unassigned to the home network and restricted from communicating with access points of the home network and the user device claiming the newly powered on access point for assignment to the home network, the user device being one of (1) unconnected to the home network and (2) a client of the home network connected to one of the access points of the home network, receive configuration information for the claimed newly powered on access point from the user device via a disjoint network between the cloud controller and the user device that is separate from and does not include the home network and the access points thereof; and
assign the newly powered on access point to the home network and provision the claimed newly powered on access point for the home network based on the configuration information received from the user device, wherein the access points of the home network are restricted by the cloud controller to only communicate and operate with the access points assigned by the cloud controller to the home network.

20. The cloud controller of claim 19, wherein the newly powered on access point is discovered via a first networking protocol associated with a first network interface on a user device and the claimed newly powered on access point is relayed via a second networking protocol with a second network interface user device, and where the second networking protocol is different from the first networking protocol.

* * * * *